(12) United States Patent
Agrawal et al.

(10) Patent No.: US 11,526,474 B2
(45) Date of Patent: Dec. 13, 2022

(54) REDUCING REQUESTS USING PROBABILISTIC DATA STRUCTURES

(71) Applicant: salesforce.com, inc., San Francisco, CA (US)

(72) Inventors: Atish Agrawal, Seattle, WA (US); Jameison Bear Martin, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 162 days.

(21) Appl. No.: 16/777,872

(22) Filed: Jan. 30, 2020

(65) Prior Publication Data
US 2021/0240674 A1    Aug. 5, 2021

(51) Int. Cl.
*G06F 16/00* (2019.01)
*G06F 16/21* (2019.01)
*G06F 12/0804* (2016.01)
*G06F 16/215* (2019.01)
*G06F 16/2455* (2019.01)

(52) U.S. Cl.
CPC ........ *G06F 16/212* (2019.01); *G06F 12/0804* (2013.01); *G06F 16/215* (2019.01); *G06F 16/219* (2019.01); *G06F 16/24552* (2019.01); *G06F 2212/601* (2013.01)

(58) Field of Classification Search
CPC .. G06F 16/219; G06F 16/215; G06F 12/0804; G06F 16/24552; G06F 2212/601; G06F 16/212
See application file for complete search history.

(56) References Cited

U.S. PATENT DOCUMENTS

| | | | |
|---|---|---|---|
| 8,352,421 B2 * | 1/2013 | Little | G06F 16/2365 707/609 |
| 9,367,574 B2 | 6/2016 | Gupta | |
| 2005/0055512 A1 * | 3/2005 | Kishi | G06F 3/0647 711/135 |
| 2006/0041724 A1 | 2/2006 | Steely, Jr. et al. | |

(Continued)

FOREIGN PATENT DOCUMENTS

WO     2019/144100 A1    7/2019

OTHER PUBLICATIONS

International Search Report and Written Opinion in PCT Appl. No. PCT/US2021/013623 dated Apr. 30, 2021, 16 pages.

(Continued)

*Primary Examiner* — Shiow-Jy Fan
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed relating to providing and using probabilistic data structures to at least reduce requests between database nodes. In various embodiments, a first database node processes a database transaction that involves writing a set of database records to an in-memory cache of the first database node. As part of processing the database transaction, the first database node may insert, in a set of probabilistic data structures, a set of database keys that correspond to the set of database records. The first database node may send, to a second database node, the set of probabilistic data structures to enable the second database node to determine whether to request, from the first database node, a database record associated with a database key.

15 Claims, 9 Drawing Sheets

(56) References Cited

U.S. PATENT DOCUMENTS

| | | | |
|---|---|---|---|
| 2009/0300022 A1* | 12/2009 | Little | G06F 16/2365 |
| 2013/0132408 A1 | 5/2013 | Little | |
| 2013/0173853 A1 | 7/2013 | Ungureanu et al. | |
| 2015/0178329 A1* | 6/2015 | Andrei | G06F 16/2365 |
| | | | 707/609 |
| 2015/0186160 A1* | 7/2015 | Arora | G06F 11/3423 |
| | | | 713/1 |
| 2016/0055195 A1* | 2/2016 | Sinha | G06F 16/252 |
| | | | 707/781 |
| 2017/0031976 A1 | 2/2017 | Chavan et al. | |
| 2017/0091756 A1* | 3/2017 | Stern | G06Q 20/367 |
| 2017/0147628 A1* | 5/2017 | Park | G06F 16/2379 |
| 2017/0147638 A1* | 5/2017 | Park | G06F 16/2379 |
| 2018/0218023 A1* | 8/2018 | Fanghaenel | G06F 16/2343 |
| 2018/0373604 A1* | 12/2018 | Martin | G06F 11/1469 |
| 2018/0373708 A1* | 12/2018 | Martin | G06F 16/2282 |
| 2019/0236156 A1 | 8/2019 | Fanghaenel et al. | |
| 2019/0392006 A1* | 12/2019 | Horowitz | G06F 16/178 |
| 2020/0057782 A1* | 2/2020 | Idreos | G06F 16/9535 |

OTHER PUBLICATIONS

Zhu et al., "Fault-tolerant precise data access on distributed log-structured merge-tree," Frontiers of Computer Science, Springerberlin Heidelberg, Berlin/Heidelberg,vol. 13, No. 4, May 27, 2019 (May 27, 2019), pp. 760-777, XP036793038, ISSN: 2095-2228, DOI:10.1007/SII704-018-7198-6[ retrieved on May 27, 2019] sections 2.2, 3.3, 3.4, 5.2.

Sears et al., "bLSM:* A General Purpose Log Structured Merge Tree," Proceedings of the 2012 International Conference on Management of Data, SIGMOD1 12 May 20, 2012, p. 217, XP055572849, New York, New York, USADOI: 10.1145/2213836.2213862ISBN: 978-1-4503-1247-9 section 4.4.3.

Luo et al., "LSM-based Storage Techniques: A Survey," arxiv.org, Cornell University Library, 201OLIN Library Cornell University Ithaca, NY 14853,Dec. 18, 2018, XP081444204,DOI: 10.1007/S00778-019-00555-Y section 2.2.2.

* cited by examiner

REDUCING REQUESTS USING PROBABILISTIC DATA STRUCTURES

BACKGROUND

Technical Field

This disclosure relates generally to database systems and, more specifically, to reducing calls/requests between database nodes using probabilistic data structures.

Description of the Related Art

Modern database systems routinely implement management systems that enable users to store a collection of information in an organized manner that can be efficiently accessed and manipulated. In some cases, these management systems maintain a log-structured merge-tree (LSM tree) having multiple levels that each store information as key-value pairs. An LSM tree usually includes two high-level components: an in-memory cache and a persistent storage. In operation, a database system initially writes database records into the in-memory cache before later flushing them to the persistent storage.

Figure 1:
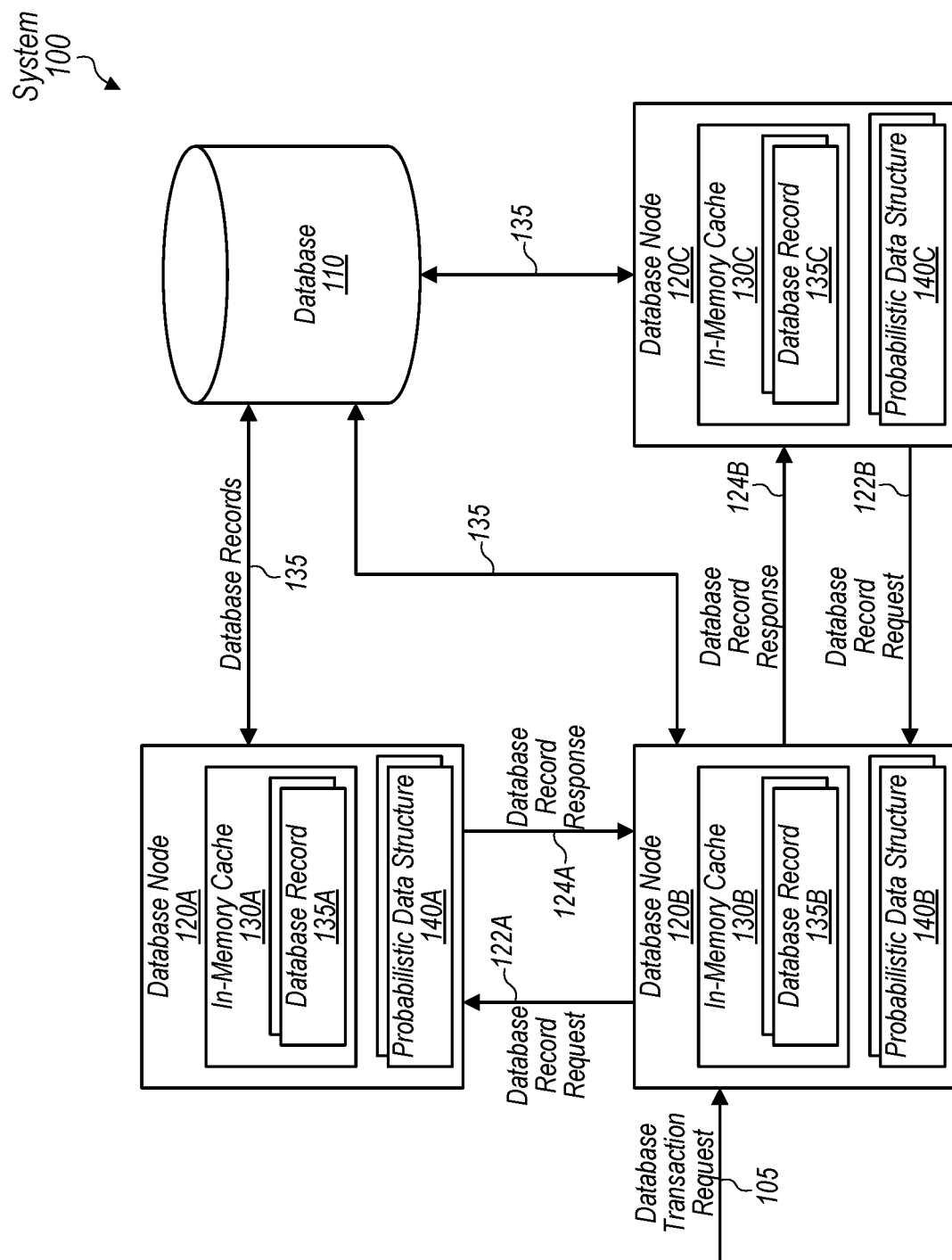
FIG. 1 is a block diagram illustrating example elements of a system having database nodes that include probabilistic data structures, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a processor having eight processing cores, the terms "first" and "second" processing cores can be used to refer to any two of the eight processing cores. In other words, the first and second processing cores are not limited to processing cores 0 and 1, for example.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

In some implementations, a database system maintaining a LSM tree writes records into an in-memory cache of the LSM tree before writing those records into a persistent storage that is associated with the LSM tree. In some approaches, the database system includes a single database node that is responsible for writing records into the LSM tree. In other approaches, the database system includes multiple database nodes that write records into the LSM tree while also reading records from the LSM tree. These database nodes may share a common persistent storage, but each have their own in-memory cache. In this scenario, records that are written by a database node into its in-memory cache, however, are not visible to other database nodes until those records are flushed to the common persistent storage. The present inventors have recognized that this arrangements causes certain inefficiencies. Consider a first database node that is processing a transaction that involves accessing the latest version of a certain record. This record may be stored in the in-memory cache of a second database node and thus is not visible to the first database node. As a result, the first database node has to issue a request to the second database node in order to determine whether the second database node has the latest version of that record.

In many cases, the size of the in-memory cache of a database node can be quite small (e.g., 2 GB or 10 GB) and as such, can store only a limited number of records at any point in time. As a result, even though many record requests are generated by database nodes, many if not most of these requests do not result in a record being return. Consequently, although the requested record is often not present in the in-memory cache of the second database node, the first database node still has to make a request to the second database node to see if the record is there. The present inventors have recognized that this slows down the overall operation of the database system because the database nodes spend an extensive amount of time issuing record requests to one another, even though these requests often do not result in a record being returned. This disclosure addresses this technical problem of too many resources being consumed as a result of too many requests being sent between database nodes for records that are usually not present at the other database node.

This disclosure describes techniques for implementing probabilistic data structures that enable database nodes to determine whether to request a database record from another database node. As used herein, the term "probabilistic data structure" refers to a data structure that stores information indicating that a particular item either does not exist or might exist at a particular location within a system. For example, a probabilistic data structure can store information that indicates that a database record, for a particular database key, does not exist or might exist at an in-memory cache of a certain database node. Bloom filters, cuckoo filters, hyperloglog-related structures, and surf tries are examples of probabilistic data structures.

In various embodiments that are described below, a system includes multiple database nodes that are capable of writing database records to their own local in-memory cache before flushing those database records to a persistent storage shared by those database nodes. When writing a database record into an in-memory cache, in various embodiments, a database node inserts a database key of the database record into a probabilistic data structure. As used herein, the phrase "inserting a database key into a probabilistic data structure" broadly refers to causing a modification to information in the probabilistic data structure based on the database key. The database key itself does not have to be stored in the probabilistic data structure. For example, a set of hash functions may be applied to the database key to derive a set of hash values. Those hash values can be used to set bits in the probabilistic data structure.

To insert a database key into a probabilistic data structure, in various embodiments, a database node applies a set of hash functions to derive a set of corresponding hash values. One of the hash values may be used to select a portion or "cache line" within the probabilistic data structure. The remaining hash values may be used to set bits within the cache line to represent the database key. During operation, a database node may insert various database keys into one or more probabilistic data structures. In some embodiments, the database node inserts database keys into a probabilistic data structure until a threshold number of keys have been inserted into the probabilistic data structure. (This threshold may correspond to some maximum size for the data structure; this could be a system design choice or a configuration setting in various embodiments.) The database node may then create another probabilistic data structure and begin inserting database keys into it. As a result, in various cases, a database node may create a stack of probabilistic data structures, each being associated with a different set of database keys.

The database node may provide probabilistic data structures from the stack to a second database node. In some embodiments, the database node provides probabilistic data structures from the stack as part of a response to a request from the second database node for a database record associated with a specified database key. In some embodiments, the database node may provide, to that second database node, only those probabilistic data structures that been created or changed since the second database node last received probabilistic data structures. For example, when the second database node initially communicates with the first database node, the first database node may provide all the probabilistic data structures from its stack. Afterwards, the first database node may add a new probabilistic data structure to the stack. When the second database nodes sends a request to the first database node for a database record, the first database node may provide, as part of a response to the request, the new probabilistic data structure, but not other ones from the stack.

A database node that receives probabilistic data structures may use those probabilistic data structures to determine whether to request a database record from another database node (e.g., the owner of those probabilistic data structures). During operation, a database node may receive a request to process a database transaction that involves accessing a database record for a specified database key. The specified database key, however, may fall within a key space that is managed by a second database node. As such, the former database node (a first database node) may check probabilistic data structures associated with the second database node to determine if it should request a database record from the second database node. In order to check a probabilistic data structure, in some embodiments, the first database node applies, to the specified database key, the same set of hash functions that was used by the second database node for inserting database keys into that probabilistic data structure. If the hash values derived for the specified database key match bits set in the probabilistic data structure, then the first database node may determine that a database record might exist at the second database node for the specified database key; otherwise, the first database node determines that there is no database record for that key at the second database node.

These techniques may be advantageous over prior approaches as these techniques allow for database nodes to communicate in a more effective manner that involves reducing the number of database record requests sent between database nodes. In prior approaches, a database node would issue a request to another database node for database record if the database key for that record fell within the key space of that other database node. By using probabilistic data structures discussed in the present disclosure, a database node can determine whether to issue a request to another database node for a database record. If a probabilistic data structure does not have information set that indicates a particular database key, then the database node knows that a database record for that particular database key does not exist at the other database node and thus does not have to make a request to that other database node.

These techniques may also provide additional advantages. In various cases, a database system may have multiple processors that are interacting with cache lines that may correspond to probabilistic data structures. When inserting a database key into a probabilistic data structure in a non-single-cache-line approach, multiple hash values of that key may map to different cache lines. Updating the bits of probabilistic data structures may happen by atomic compare and swap operations that need the processor to take ownership of a cache line, preventing other processors from updating the cache line in the meantime. As a result, when the key hash values map to multiple cache lines, the processor has to fight for ownership of those cache lines a greater number of times in a concurrent system. This can cause more processor stalls (waiting for ownership of cache line) and reduce the insert performance of keys into probabilistic data structures. In a single-cache-line approach, all the key hash values map to the same hardware cache line. This allows for a processor to seek ownership of only a single cache line instead of multiple cache liens. Thus, the processor may spend less time waiting for the ability to insert a database key. An exemplary application of these techniques will now be discussed, starting with reference to FIG. 1.

Turning now to FIG. 1, a block diagram of a system 100 is shown. System 100 includes a set of components that may be implemented via hardware or a combination of hardware and software routines. In the illustrated embodiment, system 100 includes a database 110 and a set of database nodes 120A-C. As further illustrated, database nodes 120A-C each include an in-memory cache 130 (which stores respective database records 135A-C) and a set of probabilistic data structures 140. In some embodiments, system 100 may be implemented differently than illustrated. For example, system 100 may include more or less database nodes 120.

System 100, in various embodiments, implements a platform service that allows users of that service to develop, run, and manage applications. As an example, system 100 may be a multi-tenant system that provides various functionality to a plurality of users/tenants hosted by the multi-tenant system. Accordingly, system 100 may execute software routines from various, different users (e.g., providers and tenants of system 100) as well as provide code, web pages, and other data to users, databases (e.g., database 110), and other entities associated with system 100. As depicted, system 100 includes database nodes 120A-C that interact with database 110 to store and access data for users that are associated with system 100.

Database 110, in various embodiments, is a collection of information that is organized in a manner that allows for access, storage, and manipulation of that information. Accordingly, database 110 may include supporting software that allows for database nodes 120 to carry out operations (e.g., accessing, storing, etc.) on information in database 110. As depicted, database 110 is shared between database nodes 120A-C such that database records 135 that are written by one database node 120 are accessible by other database nodes 120. In some embodiments, database 110 is implemented by a single or multiple storage devices that are connected together on a network (e.g., a storage attached network (SAN)) and are configured to redundantly store information in order to prevent data loss. These storage devices may store data persistently and thus database 110 may serve as a persistent storage.

In various embodiments, database 110 implements a part of a log-structured merge-tree (LSM tree) having multiple levels of database records 135. As previously mentioned, an LSM tree may include two high-level portions: an in-memory portion and an on-disk portion. One or more levels of the LSM tree may comprise database records 135 that are written to an in-memory cache 130. The remaining levels of the LSM tree may comprise database records 135 that are written to database 110. Accordingly, in-memory caches 130A-C may facilitate the in-memory portion of an LSM tree while database 110 facilitates the on-disk portion of that LSM tree.

Database nodes 120, in various embodiments, are hardware, software, or a combination thereof capable of providing database services, such as data storage, data retrieval, and data manipulation. These database services may be provided to other components within system 100 or to components external to system 100. As shown, database node 120B receives a database transaction request 105—this request might be received from an application server (not shown) that is attempting to access a set of database records 135. As an example, database transaction request 105 may specify an SQL SELECT command that selects one or more rows from one or more database tables. The contents of a row may be defined in a database record 135 and thus a database node 120 may return one or more database records 135 that correspond to the selected one or more table rows. In some cases, a database transaction request 105 may instruct a database node 120 to write one or more database records 135 for the LSM tree. A database node 120, in various embodiments, initially writes database records 135 to its in-memory cache 130 before flushing those database records to database 110.

In-memory caches 130, in various embodiments, are buffers that store data in memory (e.g., random access memory (RAM)) of database nodes 120. HBase™ Memstore may be an example of an in-memory cache 130. As mentioned, a database node 120 may initially write a database record 135 (e.g., in the form of a key-value pair) in its in-memory cache 130. In some cases, the latest/newest version of a row in a database table may be found in a database record 135 that is stored in an in-memory cache 130. Database records 135, however, that are written to a database node 120's in-memory cache 130 are not visible to other database nodes 120 in various embodiments. That is, those other database nodes 120 do not know, without asking, what information is stored within the in-memory cache 130 of that database node 120. In order to determine whether an in-memory cache 130 is storing a database record 135 associated with a particular key, in some cases, a database node 120 may issue a database record request 122 to the database node 120 of the in-memory cache 130. Such a database record request 122 may include the particular key and the database node 120 may return a database record 135 if there is one that corresponds to the particular key.

In many instances, one database node 120 may return a database record response 124 to another database node 120 where that response does not include a database record 135. This may be because, in various embodiments, in-memory cache 130 is relatively small in size and thus the chance of a database record 135 corresponding to a particular key being in in-memory cache 130 may be relatively low. Accordingly, in various embodiments, a database node 120 uses probabilistic data structure 140 to reduce the amount of database record requests 122 that it issues to another database node 120 that provided those particular probabilistic data structure 140.

Probabilistic data structures 140, in various embodiments, are data structures that store information that is indicative of a probability that a database record 135 exists in an in-memory cache 130 for a corresponding database key. As mentioned, a database node 120 can receive a database transaction request 105 that may involve writing one or more database records 135 to its in-memory cache 130. When writing a database record 135 to its in-memory cache 130, in some embodiments, the database node 120 inserts a database key corresponding to the database record 135 into a probabilistic data structure 140. To insert the database key into a probabilistic data structure 140, in various embodiments, the database node 120 performs one or more hash functions on the database key to derive a set of hash values. These hash values may be used to select a portion of the probabilistic data structure 140 and to set bits of information within the portion.

A database node 120 that receives a probabilistic data structure 140 may perform the same one or more hash functions on a certain database key to determine if the appropriate bits have been set for that database key. If the appropriate bits have been set for that database key, then the database node 120 may determine that a database record 135 for the database key may exist at the in-memory cache 130 of the database node 120 that provided the probabilistic data structure 140. If the appropriate bits have not been set for that database key, then the database node 120 may determine that a database record 135 for the database key does not exist at the in-memory cache 130 of that other database node 120. If a database record 135 might exist, in various embodiments, the database node 120 sends a database record request 122 to the other database node 120 for the potential database record 135.

Figure 2A:
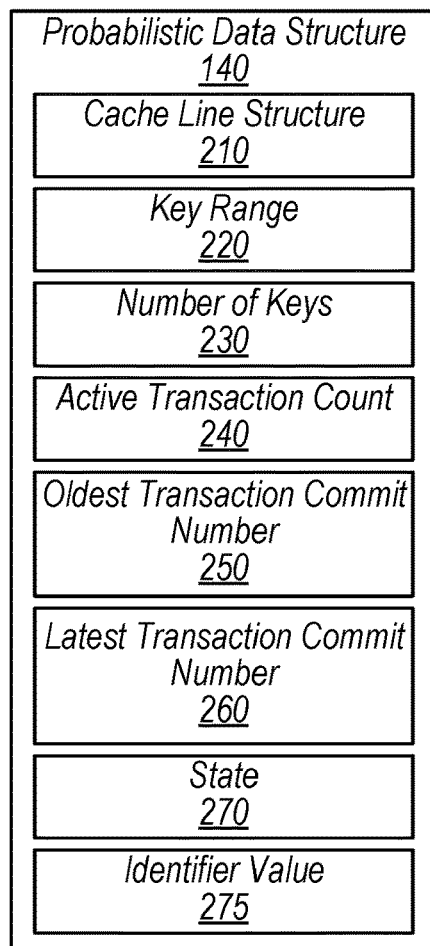
FIG. 2A is a block diagram illustrating example elements of a probabilistic data structure, according to some embodiments.

Turning now to FIG. 2A, a block diagram of an example probabilistic data structure 140 is shown. In the illustrated embodiment, probabilistic data structure 140 includes a cache line structure 210, a key range 220, a number of keys value 230, an active transaction count 240, an oldest transaction commit number 250, a latest transaction commit number 260, a state 270, and an identifier value 275. In some embodiments, probabilistic data structure 140 may be implemented differently than illustrated. As an example, probabilistic data structure 140 may include an identifier value. When one database node 120 purges a probabilistic data structure 140, it may provide the identifier value of that probabilistic data structure 140 to another database node 120 so that the other database node 120 may purge its own copy of that probabilistic data structure 140.

Cache line structure 210, in various embodiments, is a data structure capable of storing information that indicates, for a database key, one of two data points: 1) that a database record for that database key is not stored at an in-memory cache 130 associated with probabilistic data structure 140 or 2) a database record for that database key might be stored at that in-memory cache 130. In various embodiments, cache line structure 210 includes a plurality of cache lines, each of which may be series of bits that can be set based on database keys that are inserted into cache line structure 210. Based on what bits have been set in a particular cache line, a database node 120 may determine whether a database record for a particular database key may be stored at another database node 120's in-memory cache 130. An example of cache line structure 210 is discussed in more detail with respect to FIG. 2B.

Key range 220, in various embodiments, is a set of data values that define the range of database keys that have been inserted into probabilistic data structure 140. Key range 220 may be used by a database node 120 to determine whether to check probabilistic data structure 140 to learn whether there might be a database record 135 at another database node 120 for a certain database key. Consider an example in which database node 120B receives three probabilistic data structures 140 from database node 120A. Database node 120B may desire to determine if there is a database record 135 in in-memory cache 130A for a particular database key identified in a database transaction being processed by database node 120B. Accordingly, database node 120B may check key range 220 for each of the three probabilistic data structures 140 in order to determine if the particular database key falls within key range 220. This may allow database node 120B to save processing resources and time by not checking the cache line structure 210 of a probabilistic data structure 140 if key range 220 does not include the particular database key. In some embodiments, multiple probabilistic data structures 140 may have overlapping key ranges 220.

Number of keys value 230, in various embodiments, is a data value that is indicative of the number of database keys that have been inserted into probabilistic data structure 140. In some cases, number of keys value 230 may approximate the number of database keys that have been inserted. This may result from value 230 being incremented without any synchronization and thus some increments might be lost due to no synchronization. In various embodiments, probabilistic data structure 140 is capped after a specified number of database keys have been inserted. By capping the number of database keys that can be inserted, the false positive rate (i.e., the rate at which probabilistic data structure 140 indicates that a database record 135 is at an in-memory cache 130, but that database record is not actually there—hence, the database record 135 "may" be at that in-memory cache 130) for probabilistic data structure 140 may be kept at a target rate (e.g., 1%) since the insertion of a database key can incrementally increase the false positive rate. As such, number of keys value 230 may be used to determine whether the specified number of database keys have been inserted. After number of keys value 230 identifies a value that matches or exceeds the specified number of database keys, database node 120 may prevent additional database keys from being inserted and may generate another probabilistic data structure 140 for database key insertions.

Active transaction count 240, in various embodiments, is a data value that is indicative of the number of transactions that are each still active after inserting at least one database key into probabilistic data structure 140. For example, a database node 120 may receive a database transaction request 105 to perform a database transaction. As part of processing that database transaction, the database node 120 may insert a database key into probabilistic data structure 140. In response to inserting the database key, in various embodiments, the database node 120 increments active transaction count 240. Continuing the example, the database node 120 may receive another database transaction request 105 to perform a second database transaction. As part of processing the second database transaction, the database node 120 may insert a database key into probabilistic data structure 140. In response to inserting the database key, the database node 120 may increment active transaction count 240 to indicate two active transactions that have inserted at least one key into probabilistic data structure 140. In response to committing the first database transaction, in various embodiments, the database node 120 then decrements active transaction count 240. The database node 120 may again decrement active transaction count 240 when the second database transaction commits. In various embodiments, a database transaction can be committed in which a database node 120 acknowledges that the database transaction is complete. As a result of committing the transaction, the database records 135 associated with the committed transaction may become available to other database nodes 120 via record requests 122. Active transaction count 240 may also be decremented when a database transaction aborts.

While active transaction count 240 identifies a value that is greater than zero, in various embodiments, probabilistic data structure 140 cannot be purged. That is, a purger engine may reclaim probabilistic data structure 140 only after there are no active database transactions that are associated with probabilistic data structure 140.

Oldest transaction commit number 250, in various embodiments, is a data value that is indicative of the oldest committed transaction (in time) that inserted at least one database key into probabilistic data structure 140. That is, when a transaction is committed by database node 120, the transaction may be assigned a transaction commit number that may be based on when the transaction was committed. As a result, a transaction that is committed earlier in time than another transaction has a lesser/lower transaction commit number. Oldest transaction commit number 250, in various embodiments, is used by a database node 120 to determine whether to check probabilistic data structure 140 for a database key. For example, if a database node 120 is handling a transaction snapshot with a value less than the oldest transaction commit number 250, then that database node 120 may not check the corresponding probabilistic data structure 140.

Latest transaction commit number 260, in various embodiments, is a data value that is indicative of the latest committed transaction (in time) that inserted at least one database key into probabilistic data structure 140. Latest transaction commit number 260 may be used by a first database node 120 to determine which probabilistic data structures 140 to send to a second database node 120. For example, when that second database node 120 sends a request to that first database node 120 for a database record, the request may identify a transaction commit number. The transaction commit number may correspond to the latest transaction commit number 260 of the probabilistic data structures 140 that the second database node 120 received previously from the first database node 120. The first database node 120 may send a response that includes probabilistic data structures 140 having a latest transaction commit number 260 that is greater than the transaction commit number specified in the second database node 120's request.

State 270, in various embodiments, is a data value indicative of what stage probabilistic data structure 140 is at in its lifecycle. In various embodiments, there are three different stages to the lifecycle of probabilistic data structure 140: open, closed, and unused. Probabilistic data structure 140 may initially start in the "open" stage of its lifecycle and thus have a state 270 of "open." While in the "open" stage of its lifecycle, probabilistic data structure 140 may be used for database key insertions that result from currently running database transactions. In various embodiments, after a specified number of database keys have been inserted into probabilistic data structure 140, its state 270 is updated to "closed." While in the "closed" stage, probabilistic data structure 140 may continue to be used by database nodes 120, but no more database keys may be inserted into it. As a result, currently running database transactions may proceed with inserts into a new probabilistic data structure 140.

Identifier value 275, in various embodiments, is a value that identifies probabilistic data structure 140 from other probabilistic data structures 140. In various cases, identifier value 275 may enable a database node 120 to refresh a stale copy of probabilistic data structure 140 since probabilistic data structure 140 may be updated and shared multiple times over the course of its existence. As an example, a transaction might continue to insert keys into probabilistic data structure 140 after probabilistic data structure 140 has been provided to another database node 120. If the updated probabilistic data structure 140 is again shared with the other database node 120, the other database 120 may use identifier value 275 in order to identify the older version of probabilistic data structure 140 so that it can be replaced with the updated version. In some embodiments, a database node 120 may include identifier value 275 as part of a database record request 122 so that the receiving database node 120 may determine whether the corresponding probabilistic data structure 140 has been updated and should be returned as a part of a database record response 124.

In some embodiments, after probabilistic data structure 140's latest transaction commit number 260 passes beyond a flusher transaction commit number (which may identify the latest transaction flushed to database 110), a purger engine executing on the corresponding database node 120 begins a procedure to retire probabilistic data structure 140. The purger engine may transition probabilistic data structure 140 to an "unused" state. Accordingly, state 270 may be updated to reflect that probabilistic data structure 140 is in an unused state.

Figure 2B:
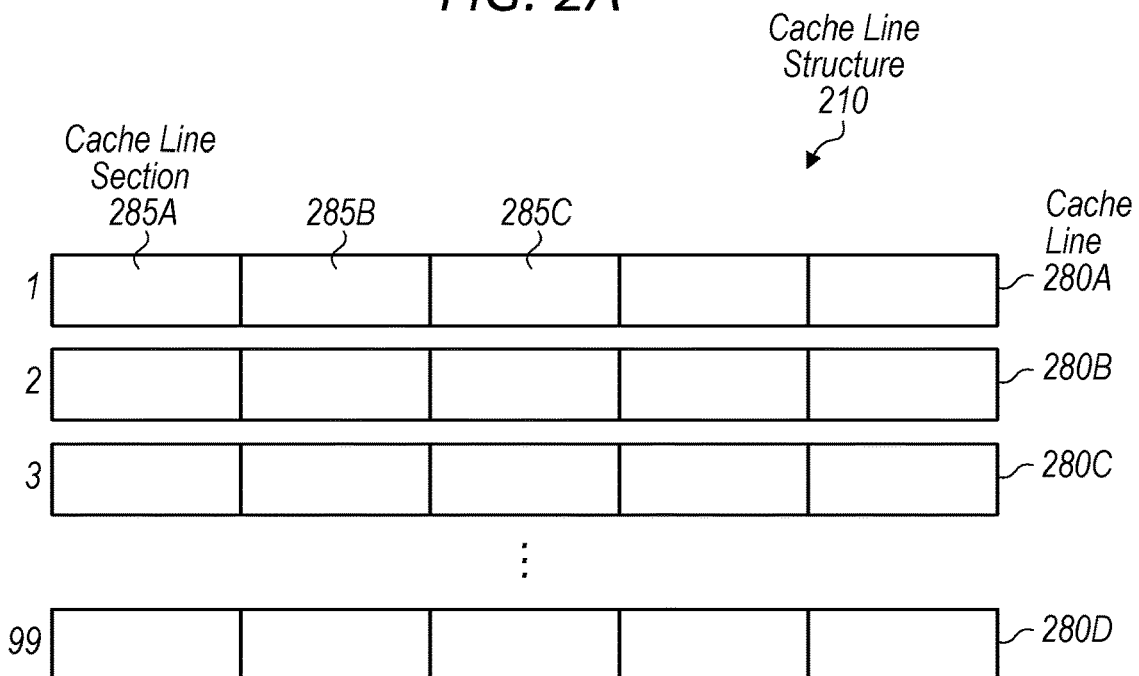
FIG. 2B is a block diagram illustrating example elements of a cache line structure of a probabilistic data structure, according to some embodiments.

Turning now to FIG. 2B, a block diagram of an example cache line structure 210 is shown. In the illustrated embodiment, cache line structure 210 includes cache lines 280A-D, each having respective cache line sections 285. In some embodiments, cache line structure 210 may be implemented differently than illustrated. While cache lines 280A-D are depicted as not being connected, in some embodiments, cache lines 280A-D are part of a continuous segment of memory in which a given cache line 280 may be identified by a offset value and may span a set number of bytes in that segment.

Cache lines 280, in various embodiments, are each a collection of bits that may be set as part of inserting a database key into a probabilistic data structure 140. Accordingly, a cache line section 285 may be a bit value. In various embodiments, a cache line 280 is a hardware construct; yet in other embodiments, a cache line 280 may be implemented in software. As shown, there are five cache line sections 285 (i.e., five bits) per cache line 280, although the amount of bits per cache line 280 can be different in other embodiments. In some cases, the amount of bits per cache line 280 may be based on a desired size of cache line structure 210 and a desired false positive rate. As discussed in more detail with respect to FIG. 3, an initial hash function may be performed to generate a hash value that is usable to select a cache line 280 (e.g., cache line 280A) and then a set of hash functions may be performed to generate hash values that are usable to set bits of that cache line 280 (e.g., set bits of sections 285A and 285C). The number of bits that are set may be based on a property of system 100. For example, system 100 may provide an instruction that permits simultaneous loading from 8 different locations. Accordingly, 8 bits may be set within a cache line 280 for a given database key in order to benefit from the property of that instruction.

Figure 3:
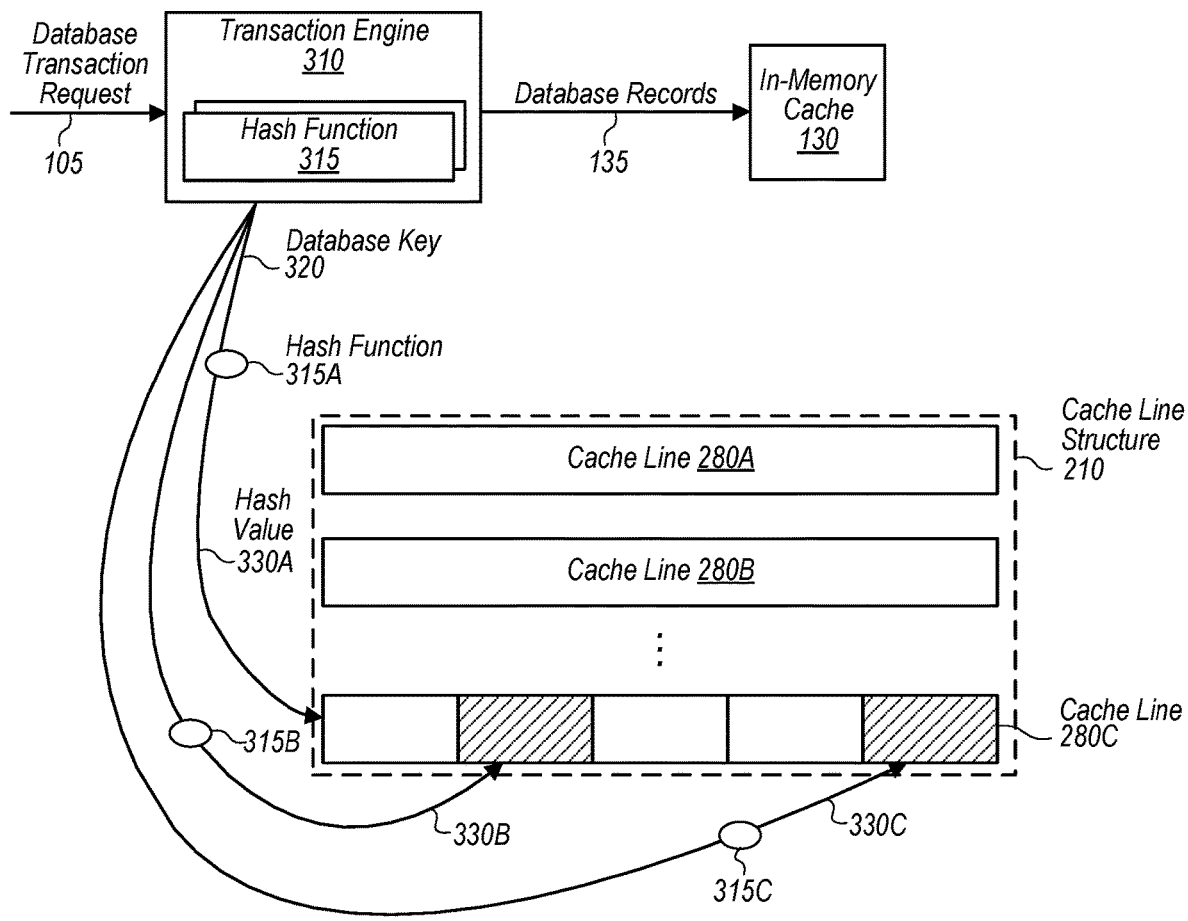
FIG. 3 is a block diagram illustrating example elements of a transaction engine capable of inserting a database key in a cache line structure, according to some embodiments.

Turning now to FIG. 3, a block diagram of an example transaction engine 310 is shown. In the illustrated embodiment, transaction engine 310 includes hash functions 315. As further depicted, transaction engine 310 interacts with in-memory cache 130 and cache line structure 210. In some embodiments, transaction engine 310 may be implemented different than shown.

Transaction engine 310, in various embodiments, is a set of software routines that are executable to process database transactions, which can include inserting database records 135 into in-memory cache 130 and corresponding database keys 320 into cache line structures 210 of probabilistic data structures 140. As discussed in more detail with respect to FIG. 4, as part of processing a database transaction, transaction engine 310 may issue database record requests 122 to other transaction engines 310 at other database nodes 120 in order to potentially receive database records 135 from the other in-memory caches 130.

As depicted, transaction engine 310 can receive a database transaction request 105. In various cases, processing a database transaction request 105 may involve writing one or more database records 135 to in-memory cache 130. When a database record 135 is written into in-memory cache 130, in various embodiments, transaction engine 310 inserts the corresponding database key 320 into cache line structure 210. In some embodiments, transaction engine 310 may perform a bulk insertion of database keys 320 of that transaction into probabilistic data structure 140 followed by initiating a transaction commit—in some cases, the bulk insertion is performed as part of a pre-commit phase in which a database node 120 performs a set of actions before finally committing the transaction.

In order to insert database key 320 into cache line structure 210, transaction engine 310 may perform a set of hash function 315 on database key 320 to derive a set of hash values. A hash function 315, in various embodiments, is a function that is performable to map data (e.g., database key 320) of arbitrary size to fixed-size values. Hash functions 315 may, for example, correspond to hash functions found in the MurmurHash family. When inserting database key 320 into cache line structure 210, transaction engine 310 may initially perform a hash function 315 on database key 320 to derive a hash value usable to select a cache line 280. As illustrated, transaction engine 310 performs hash function 315A on database key 320 to derive hash value 330A. Hash value 330A is used to select cache line 280C. As a result, transaction engine 310 may set bits within cache line 280C. In order to determine which bits to set, transaction engine 310 may perform additional hash functions 315 to derive additional hash values used to set bits in a cache line 280. As illustrated, transaction engine 310 performs hash functions 315B and 315C on database key 320 to derive hash values 330B and 330C, respectively. Hash values 330B and 330C are used to set bits within cache line 280C.

In some embodiments, information indicative of a database key range may be inserted into a cache line structure 210. Transaction engine 310 may perform the procedure discussed above on a prefix portion shared between database keys in the database key range. As a result, the prefix portion may be inserted into a cache line structure 210. A database node 120 further may determine whether to request database records associated with a key range from another database node 120 by checking for insertion of the prefix portion in probabilistic data structures 140 received from that other database node 120.

Figure 4:
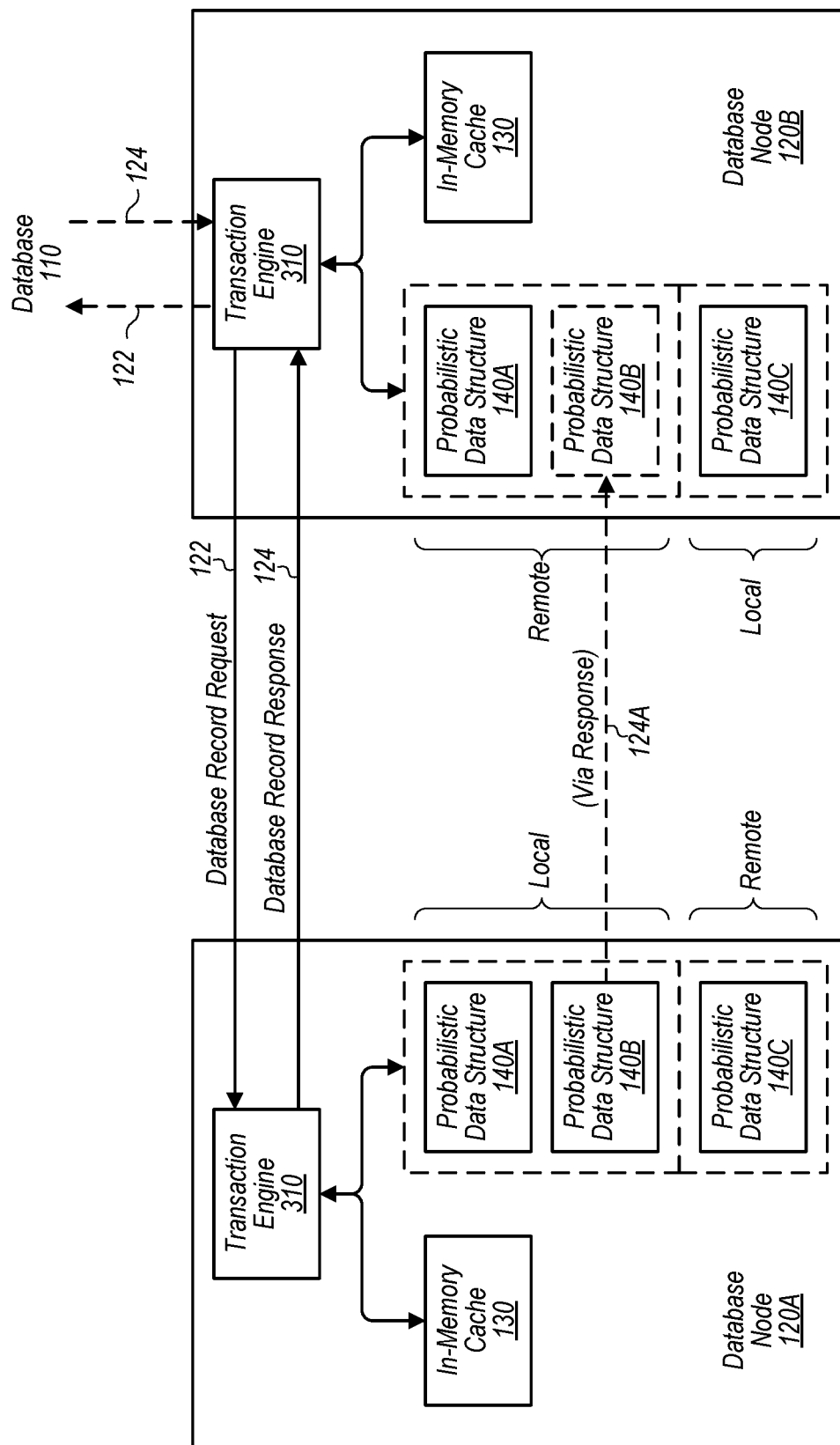
FIG. 4 is a block diagram illustrating example elements of interactions between database nodes having probabilistic data structures, according to some embodiments.

Turning now to FIG. 4, a block diagram of example database nodes 120A and 120B is shown. In the illustrated embodiment, database nodes 120A and 120B include an in-memory cache 130, probabilistic data structures 140A-C, and a transaction engine 310. As illustrated, probabilistic data structures 140A and 140B are local to database node 120A in that they were generated by database node 120A while probabilistic data structure 140C is local to database node 120B in that it was generated by database node 120B. The illustrated embodiment may be implemented differently than shown—e.g., database nodes 120A and 120B may include a purger engine.

As mentioned previously, database nodes 120 may provide database services (e.g., data storage) to tenants (e.g., an organization) of system 100. A tenant's data may define a keyspace that is associated with that tenant. In some embodiments, a keyspace may be split into multiple keyspace partitions that are each assigned to a respective database node 120. Consequently, a database node 120 may write only database records that fall within its assigned keyspace to its in-memory cache 130. As a result, the probabilistic data structures 140 produced by a database node 120 may correspond to its assigned keyspace. Accordingly, as an example, probabilistic data structures 140A and 140B correspond to database node 120A's keyspace and probabilistic data structure 140C corresponds to database node 120B's keyspace.

When a database node 120 wishes to access a database record 135, it may determine which keyspace that the database record 135 belongs to based on its corresponding database key 320. If that database record 135 belongs to the database node 120's own keyspace, then it may checks its own in-memory cache 130 for the database record 135 and then proceed to database 110 if the record 135 is not in its own in-memory cache 130. If that database record 135 belongs to another database node 120's keyspace (e.g., belongs to database node 120A), then the former database node 120 (e.g., database node 120B) may determine whether it has probabilistic data structures 140 that can be checked for information indicative of the database record's database key 320.

Initially, database node 120B may not have any probabilistic data structures 140 from database node 120A. Database node 120B may thus issue a database record request 122 that identifies a particular database key 320 for a database record 135. In various embodiments, as a side effect of the database record lookup, database node 120A can return probabilistic data structures 140 to database node 120B as part of a database record response 124. Probabilistic data structures 140 may be returned even if there is no database record 135 found at database node 120A's in-memory cache 130. In some embodiments, database node 120B is capable of issuing a probabilistic-data-structure-specific request to database node 120A for probabilistic data structures 140. Database node 120A may have initially generated only probabilistic data structure 140A and, as such, may return it to database node 120B as part of the database record response 124 for the database record request 122.

Afterwards, database node 120B may wish to access another database record 135 that belongs to the keyspace assigned to database node 120A. In some embodiments, database node 120B checks probabilistic data structure 140A (which it previously received) if that database record's database key 320 falls within the key range 220 of probabilistic data structure 140A and if the transaction snapshot associated with that database record 135 occurs earlier than the oldest transaction commit that is associated with probabilistic data structure 140A, which may be identified by oldest transaction commit number 250. In various cases, database node 120B may check one or the other or additional parameters to determine whether a probabilistic data structure 140 should be checked.

If applicable, database node 120B may check probabilistic data structure 140A in order to determine if there is a possibility that a database record 135 associated with the particular database key 320 is present at database node 120A's in-memory cache 130. If there is a chance, then database node 120B may send a database record request 122 to database node 120A. In some embodiments, a database record request 122 specifies a latest transaction commit number 260. Database node 120A may use commit number 260 to determine if any new probabilistic data structures 140 have been created since database node 120B last issued a database record request 122. If there are new probabilistic data structures 140 (e.g., database node 120A may have created probabilistic data structure 140B), then those probabilistic data structures 140 can be returned via a database record response 124.

As mentioned, a database node 120 may initially write database records 135 to its in-memory cache 130 before flushing those records to database 110. A database node 120 may flush database records 135 up to a particular transaction commit number or epoch. In various embodiments, when flushing database records 135 to database 110, a database node 120 may purge probabilistic data structures 140 whose latest transaction commit number 260 is less than the purge transaction commit number. For example, probabilistic data structure 140A may only be associated with a transaction "A." Accordingly, when all database records 135 associated with transaction A are flushed to database 110, database node 120A may purge probabilistic data structure 140A such that probabilistic data structure 140A is no longer provided to other database node 120. In some embodiments, a database node 120 notifies other database nodes 120 about purged probabilistic data structures 140 so that those other database nodes 120 no longer use those probabilistic data structures 140 if they previously received copies of those probabilistic data structures 140. In yet various embodiments, when database records 135 are flushed to database 110, an indication of the purge transaction commit number may be written to a catalog accessible to all database nodes 120. As such, database nodes 120 may read from the catalog to determine not to use certain probabilistic data structures 140 as they have been purged—the purging database node 120 does not have to communicate with the other database nodes 120 directly to let them know about purged probabilistic data structures 140. A database node 120 may remove stale probabilistic data structures 140 from its storage.

Figure 5:
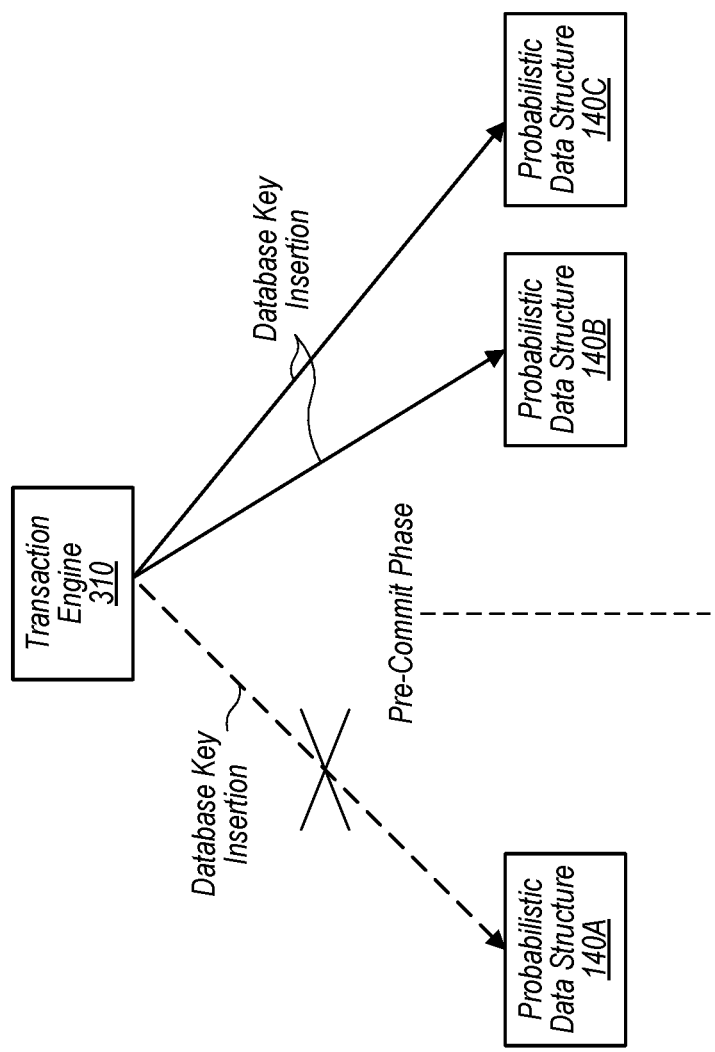
FIG. 5 is a block diagram illustrating example elements of a transaction engine handling a long-running transaction, according to some embodiments.

Turning now to FIG. 5, a block diagram of a transaction engine 310 that interacts with example probabilistic data structures 140A-C is shown. The illustrated embodiment may be implemented differently than shown—e.g., there may be more probabilistic data structures 140 than shown.

In some embodiments, database nodes 120 handle long-running transactions differently than non-long-running transactions. As mentioned, when a database node 120 initially inserts a database key 320 for a transaction into a probabilistic data structure 140, that database node 120 may register the transaction with that probabilistic data structure 140 by incrementing the active transaction count 240 of the probabilistic data structure 140. While the active transaction count 240 is non-zero, that probabilistic data structure 140 may not be purged from the database node 120. This can result in issues where long-running transactions prevent probabilistic data structures 140 from being purged and a database node 120 runs out of allocated space to create new probabilistic data structures 140. In particular, a long-running transaction (e.g., one that lasts over 2 hours) may write into a plurality of probabilistic data structures 140 that cannot be purged while the long-running transaction has not committed. In some instances, there may be multiple long-running transactions that prevent thousands of probabilistic data structures 140 from being purged for hours, for example. Accordingly, because database node 120 may not be able to purge those probabilistic data structures 140 for some time, it may not have sufficient space to allocate new probabilistic data structures 140. Thus, in some embodiments, database nodes 120 handle long-running transactions differently than non-long-running transactions.

Upon beginning processing of a database transaction, a database node 120 may initially insert database keys 320 for the database transaction into probabilistic data structures 140. As depicted for example, transaction engine 310 inserts database keys 320 into probabilistic data structure 140A. If, however, the database node 120 determines that the database transaction should be classified as a long-running database transaction, then the database node 120 may halt database key insertion for that database transaction until a pre-commit phase. To determine if the database transaction should be classified as a long-running transaction, the database node 120 may use various criteria. In various embodiments, if a database transaction last longer than (or exceeds) a specified amount of time, than that database transaction may be classified as a long-running transaction. For example, if a database node 120 has been processing a database transaction for 120 seconds, then the database transaction may be classified as a long-running transaction. In some embodiments, if a database transaction has inserted keys into a specified number of probabilistic data structures 140, than that database transaction may be classified as a long-running transaction. As an example, if in processing a database transaction, a database node 120 has inserted database keys 320 into 10 different probabilistic data structures 140, then the database transaction may be classified as a long-running transaction.

Once a database node 120 has determined that a database transaction is a long-running database transaction, in various embodiments, the database node 120 unregisters the database transaction from probabilistic data structure 140 that it has touched. To unregister the database transaction from a given probabilistic data structure 140, the database node 120 may decrement the active transaction count 240 for that given probabilistic data structure 140. This may allow the given probabilistic data structure 140 to be purged sooner than waiting for the long-running database transaction to commit. After determining that a database transaction is a long-running transaction, the database node 120 may stop inserting database keys 320 into probabilistic data structures 140 for the transaction until a pre-commit phase has been initiated by database node 120 for that transaction. In various embodiments, a transaction is committed by database node 120 after writing all database records 135 into its in-memory cache 130 for that transaction—the commit may made in relation to its in-memory cache 130. In some embodiments, instead of stopping key insertion for a long-running database transaction, database node 120 may begin writing database keys 320 into a single probabilistic data structure 140. Database node 120 may allow that probabilistic data structure 140 to exceed a threshold number of keys than it otherwise would be permitted—that is, database node 120 may allow that probabilistic data structure 140 overflow instead of creating a new probabilistic data structure 140.

Before a database node 120 commits a long-running database transaction, in various embodiments, the database node 120 performs a bulk insertion of all database keys 320 that are associated with the transaction into a new set of probabilistic data structures 140. The database node 120 may then provide the new set of probabilistic data structures 140 to another database node 120 as part of a response to a database transaction request 105 as discussed earlier. In some embodiments, a database node 120 may resume inserting database keys 320 for the database transaction instead of restarting the insertion of all database keys 320 for that database transaction.

Figure 6:
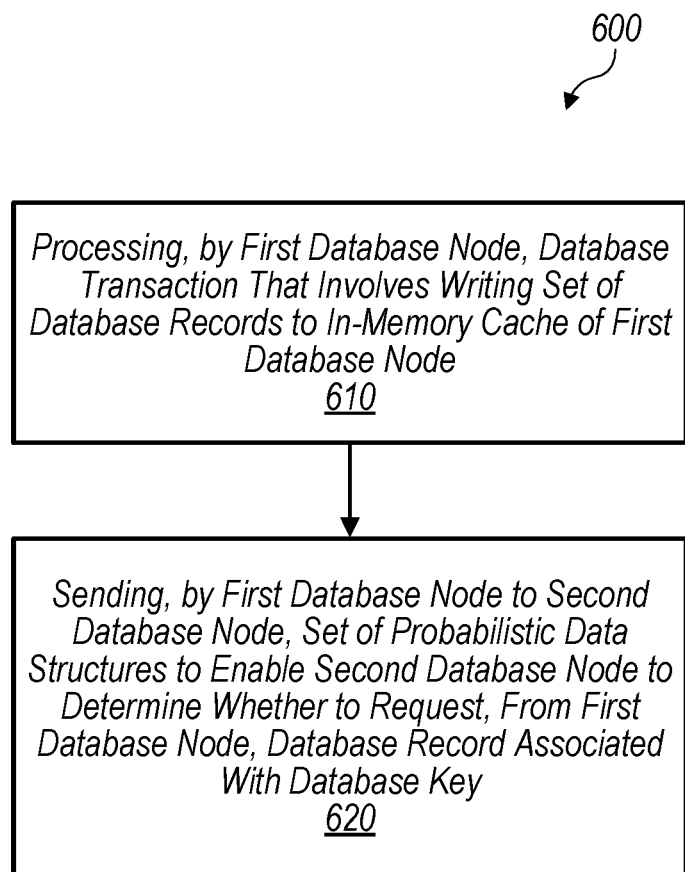
FIG. 6 is a flow diagram illustrating an example method that relates to generating and providing a set of probabilistic data structures, according to some embodiments.

Turning now to FIG. 6, a flow diagram of a method 600 is shown. Method 600 is one embodiment of a method that is performed by a first database node (e.g., database node 120A) in order to provide a second database node (e.g., database node 120B) with probabilistic data structures (e.g., probabilistic data structures 140). Method 600 may be performed by executing a set of program instructions stored on a non-transitory computer-readable medium. In some embodiments, method 600 may include more or less steps. As an example, method 600 may include a step in which the first database node writes one or more of a set of database records (e.g., database records 135) from its in-memory cache (e.g., in-memory cache 130A) to a persistent storage (e.g., database 110) shared between the first and second database nodes. The first database node may determine whether to purge one or more probabilistic data structures in response to writing those database records to the persistent storage.

Method 600 begins in step 610 with the first database node processing a database transaction that involves writing a set of database records to the in-memory cache of the first database node. The processing may include inserting, in a set of probabilistic data structures, a set of database keys (e.g., database keys 320) that correspond to the set of database records. In some embodiments, inserting a given database key into a given probabilistic data structure includes applying a hash function (e.g., a hash function 315) to the given database key to derive a hash value (e.g., a hash value 330) that corresponds to particular one of a plurality of cache lines (e.g., a cache line 280) included in the given probabilistic data structure. Accordingly, the first database node may insert the given database key in the particular cache line. Inserting the given database key in the particular cache line may include applying a set of hash functions (e.g., hash functions 315) to the given database key to derive a set of hash values and setting a set of bits (e.g., a bit of a cache line section 285) of the particular cache line based on the set of hash values.

The first database node may insert ones of the set of database keys in a first one of the set of probabilistic data structures. In some instances, in response to the first probabilistic data structure including a defined threshold number of database keys (e.g., 20,000 keys), the first database node may insert remaining ones of the set of database keys in a second, different one of the set of probabilistic data structures. In some cases, at least one of the set of probabilistic data structures may be associated with database keys from a plurality of different transactions.

In step 620, the first database node sends, to the second database node, the set of probabilistic data structures to enable the second database node to determine whether to request, from the first database node, a database record associated with a database key. After sending the set of probabilistic data structures to the second database node, the first database node may add one or more additional probabilistic data structures to the set of probabilistic data structures. The first database node may then receive, from the second database node, a database record request (e.g., a database record request 122) for a most recent version of a database record associated with a particular database key. The first database node may include, in a response (e.g., database record response 124) to the database record request, the one or more additional probabilistic data structures.

In some embodiments, a given probabilistic data structure is associated with metadata (e.g., latest transaction commit number 260) that indicates a latest transaction commit that corresponds to the given probabilistic data structure. In some cases, prior to including the one or more additional probabilistic data structures in the response, the first database node may determine to include the one or more additional probabilistic data structures based on each of the one or more additional probabilistic data structures being associated with a respective end latest transaction commit that corresponds to a later point in time than a particular transaction commit specified in the database record request.

In some embodiments, a given probabilistic data structure is associated with metadata (e.g., active transaction count 240) that indicates a number of active transactions for which database keys have been inserted in the given probabilistic data structure. The first database node may determine whether the given probabilistic data structure can be purged based on whether the number of active transactions indicates that there are active transactions for the given probabilistic data structure. In some cases, at least two of the set of probabilistic data structures may each include a respective database key inserted as part of processing the database transaction. As such, in response to committing the database transaction in relation to the in-memory cache, the first database node may decrement, for each of the at least two probabilistic data structures, the number of active transactions associated with that probabilistic data structure.

Figure 7:
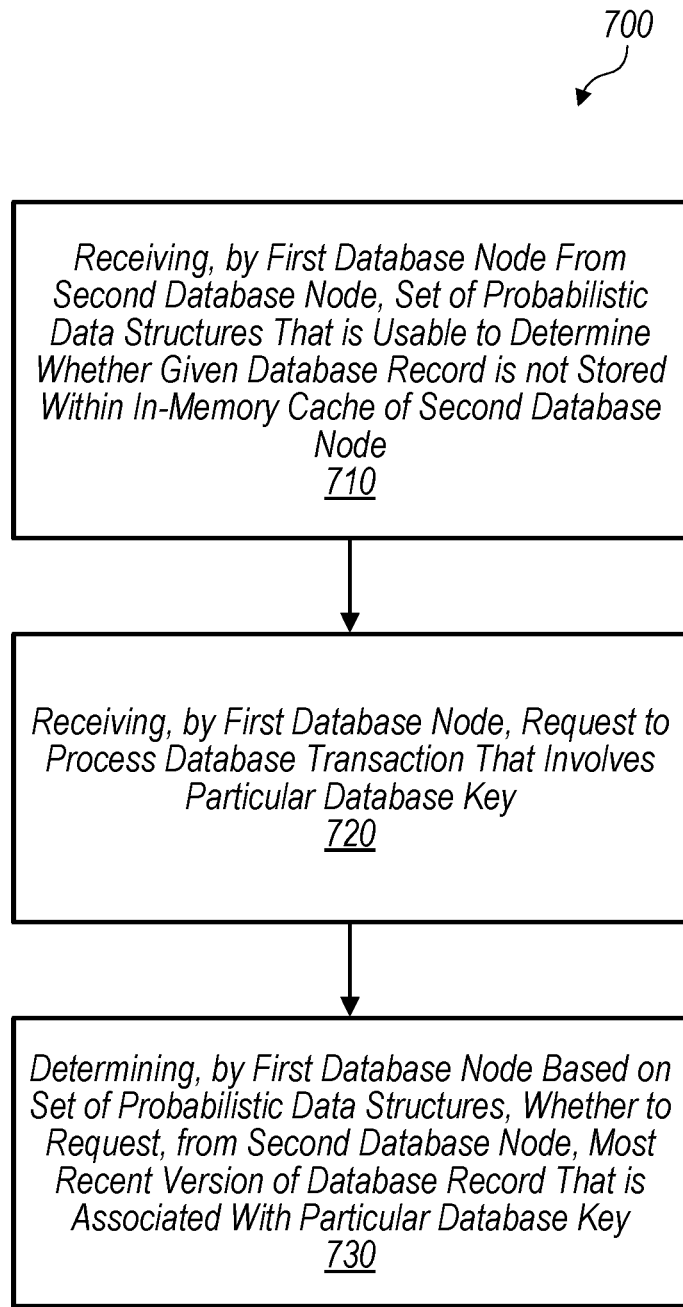
FIG. 7 is a flow diagram illustrating an example method that relates to using a set of probabilistic data structures, according to some embodiments.

Turning now to FIG. 7, a flow diagram of a method 700 is shown. Method 700 is one embodiment of a method that is performed by a first database node (e.g., database node 120A) in order to determine whether to request a database record (e.g., a database record 135) from a second database node (e.g., database node 120B). Method 700 may be performed by executing a set of program instructions stored on a non-transitory computer-readable medium. In some embodiments, method 700 may include more or less steps. As an example, method 700 may include a step in which the first database node provides a database record (received from the second database node) to an application system as part of processing a transaction request (e.g., database transaction request 105) received from the application system.

Method 700 begins in step 710 with the first database node receiving, from the second database node, a set of probabilistic data structures (e.g., probabilistic data structures 140) that is usable to determine whether a given database record is not stored within an in-memory cache (e.g., in-memory cache 130B) of the second database node. In step 720, the first database node receives a request (e.g., database transaction request 105) to process a database transaction that involves a particular database key (e.g., database key 320).

In step 730, the first database node determines, based on the set of probabilistic data structures, whether to request, from the second database node, a most recent version of a database record that is associated with the particular database key. In some embodiments, a given probabilistic data structure includes a plurality of cache lines. As such, the first database node may apply a hash function (e.g., a hash function 315) to the particular database key to derive a hash value (e.g., hash value 330). Based on the hash value, the first database node may select one of the plurality of cache lines of the given probabilistic data structure. The first database node may then determine whether information stored in the cache line is indicative of the particular database key.

In response to determining that the information stored in the cache line is not indicative of the particular database key, the first database node may request the most recent version of the database record from a persistent storage (e.g., database 110) shared by the first and second database nodes. In response to determining that the information stored in the cache line is indicative of the particular database key, the first database node may send a request (e.g., database record request 122) to the second database node for the most recent version of the database record. Accordingly, the first database node may receive a response (e.g., database record response 124) from the second database node. In some cases, the request to the second database node may identify a latest transaction commit that is associated with the set of probabilistic data structures. As such, the response may include a set of additional probabilistic data structures, each of which is associated with a transaction commit occurring later than the latest transaction commit identified by the request.

Figure 8:
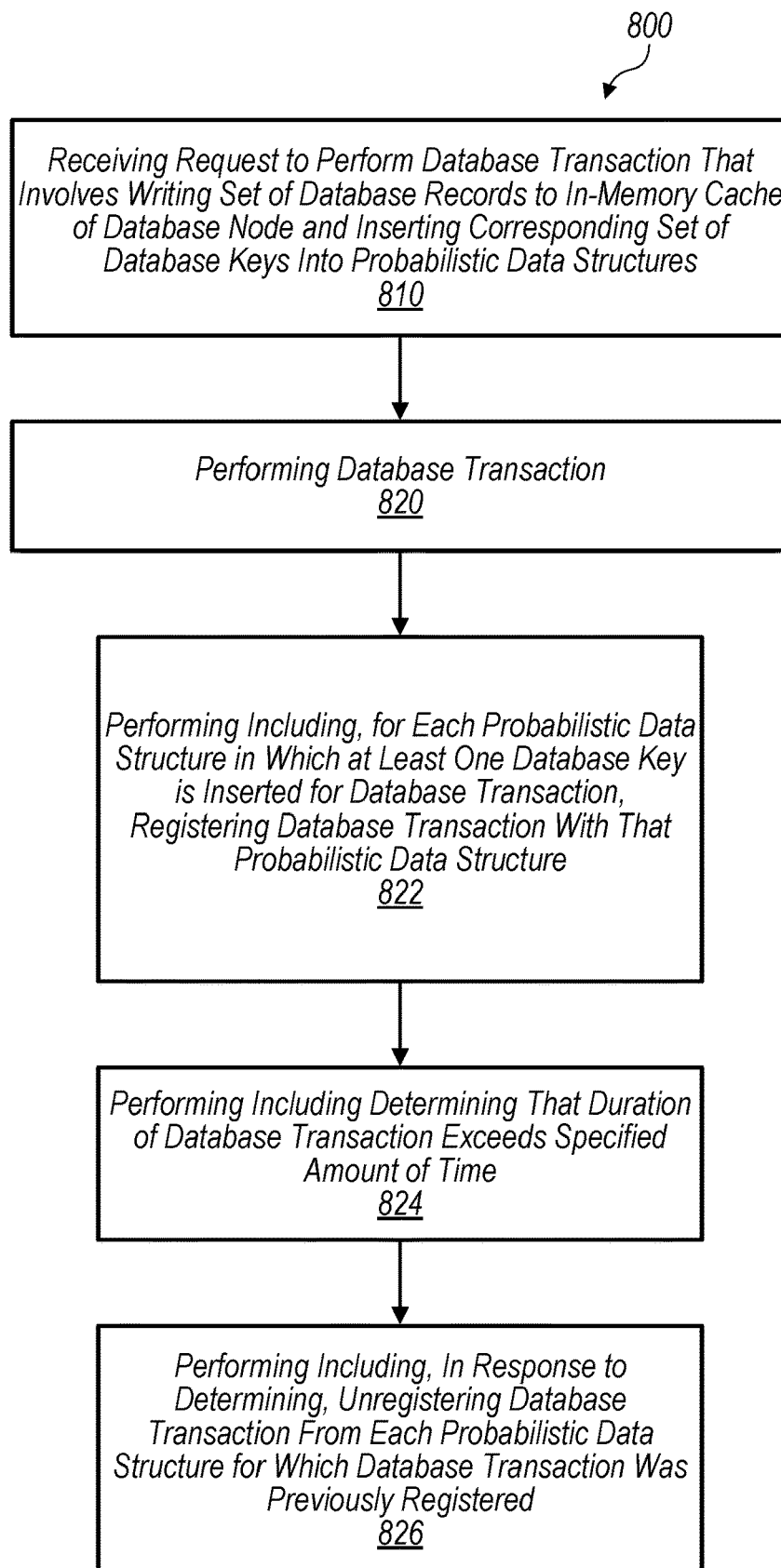
FIG. 8 is a flow diagram illustrating an example method that relates to handling a long-running transaction, according to some embodiments.

Turning now to FIG. 8, a flow diagram of a method 800 is shown. Method 800 is one embodiment of a method that is performed by a database node (e.g., a database node 120) to handle a long-running database transaction. Method 800 may be performed by executing a set of program instructions stored on a non-transitory computer-readable medium. In some embodiments, method 800 may include more or less steps. As an example, method 800 may include a step in which the database node sends, to another database node, a set of probabilistic data structures (e.g., probabilistic data structures 140) to enable the other database node to determine whether to request, from the database node, a database record (e.g., a database record 135) associated with a particular database key (e.g., a database key 320).

Method 800 begins in step 810 with a database node receiving a request (e.g., database transaction request 105) to perform a database transaction that involves writing a set of database records (e.g., database records 135) to an in-memory cache (e.g., in-memory cache 130) of the database node and inserting a corresponding set of database keys (e.g., database keys 320) into probabilistic data structures. In step 820, the database node performs the database transaction In step 822, as part of performing the database transaction, for each probabilistic data structure in which at least one database key is inserted for the database transaction, the database node registers the database transaction with that probabilistic data structure. In various cases, the registering is performed to prevent that probabilistic data structure from being deleted while the database transaction is registered. In some embodiments, a particular one of the probabilistic data structures includes metadata (e.g., active transaction count 240) that specifies a number of active transactions for which database keys have been inserted in the particular probabilistic data structure. While the number of active transactions indicates that there is at least one active transaction, the particular probabilistic data structure may be prevented from being deleted. In some cases, performing the database transaction includes inserting at least one database key in the particular probabilistic data structure. As such, the database node may register the database transaction with the particular probabilistic data structure includes updating the metadata to increment the number of active transactions.

In step 824, as part of performing the database transaction, the database node determines that a duration of the database transaction exceeds a specified amount of time (e.g., 30 seconds). In some embodiments, the database node determines that a specified number (e.g., 10) of probabilistic data structures have been written to as a part of performing the database transaction.

In step 826, as part of performing the database transaction, in response to the determining, the database node unregisters the database transaction from each probabilistic data structure for which the database transaction was previously registered. Unregistering the database transaction from the particular probabilistic data structure may include updating the metadata to decrement the number of active transactions. The decrementing may cause the number of active transactions to be zero. As such, after determining that unregistering the database transaction from a probabilistic data structure has caused the metadata to be updated to reflect that there are no active transaction, the database node may delete the particular probabilistic data structure.

In response to the determining, the database node may delay insertion of database keys for the database transaction into probabilistic data structures until a pre-commit phase for the database transaction has been initiated by the database node. In some cases, in response to initiating the pre-commit phase for the database transaction, the database node may restart insertion of the set of database keys of the database transaction into a set of probabilistic data structures. In some cases, in response to initiating the pre-commit phase for the database transaction, the database node may resume insertion of the set of database keys of the database transaction into a set of probabilistic data structures. Before committing the database transaction, the database node may delete at least one of the probabilistic data structures from which the database transaction was unregistered. In some embodiments, in response to the determining, the database node inserts remaining database keys of the set of database keys into a single probabilistic data structure.

Exemplary Computer System

Figure 9:
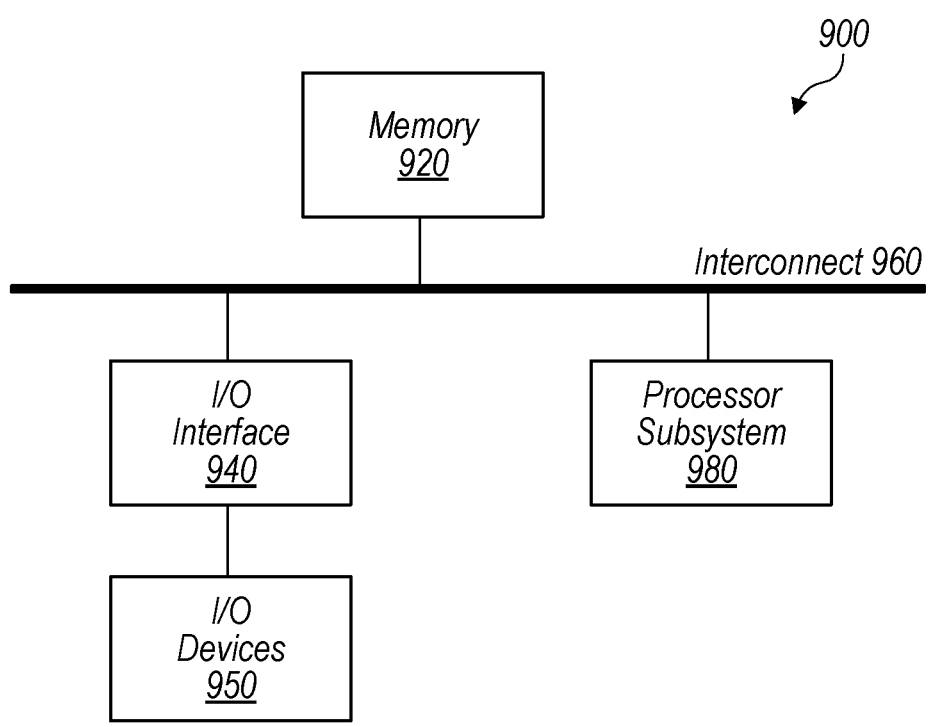
FIG. 9 is a block diagram illustrating an example computer system, according to some embodiments.

Turning now to FIG. 9, a block diagram of an exemplary computer system 900, which may implement system 100, database 110, and/or a database node 120, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Computer system 900 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement a database 110, a database node 120, an in-memory cache 130, and a probabilistic data structure 140 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
receiving, by a database node, a request to perform a database transaction that involves writing a set of database records to an in-memory cache of the database node and inserting a corresponding set of database keys into a set of probabilistic data structures; and
performing, by the database node, the database transaction, including by:
for a given probabilistic data structure in which at least one database key is inserted for the database transaction, registering the database transaction with the given probabilistic data structure by modifying an active transaction count value that is included in the given probabilistic data structure, wherein the registering is performed to prevent the given probabilistic data structure from being deleted while the database transaction is registered;
classifying the database transaction as a long-running transaction in response to determining that a duration in performing the database transaction exceeds a specified amount of time;
based on the database transaction being classified as a long-running transaction, unregistering the database transaction from the given probabilistic data structure for which the database transaction was previously registered, wherein unregistering the database transaction from the given probabilistic data structure includes modifying the active transaction count value; and
after classifying the database transaction, committing the database transaction; and
before the committing of the database transaction, the database node deleting at least one probabilistic data structure with which the database transaction was previously registered.

2. The method of claim 1, further comprising:
based on the database transaction being classified as a long-running transaction, the database node delaying insertion of database keys for the database transaction into probabilistic data structures until a pre-commit phase of the database transaction by the database node.

3. The method of claim 2, further comprising:
in response to initiating the pre-commit phase for the database transaction, the database node restarting insertion of the set of database keys of the database transaction into another set of probabilistic data structures.

4. The method of claim 1, further comprising:
in response to initiating a pre-commit phase for the database transaction, the database node inserting the set of database keys of the database transaction into a second set of probabilistic data structures; and
sending, by the database node to another database node, the second set of probabilistic data structures to enable the other database node to determine whether to request, from the database node, a database record associated with a particular database key.

5. The method of claim 1, further comprising:
based on the database transaction being classified as a long-running transaction, the database node inserting remaining database keys of the set of database keys into a single probabilistic data structure.

6. The method of claim 1, wherein the given probabilistic data structure is prevented from being deleted while the active transaction count value indicates that there is at least one active transaction.

7. The method of claim 1, wherein the method further comprises:
after determining that unregistering the database transaction from the given probabilistic data structure has caused the active transaction count value to be updated to reflect that there are no active transactions, the database node deleting the given probabilistic data structure.

8. A non-transitory computer-readable medium having program instructions stored thereon that are capable of causing a computer system to perform operations comprising:

receiving a request to perform a database transaction that involves writing a set of database records to an in-memory cache of the computer system and inserting a corresponding set of database keys into a set of probabilistic data structures; and performing the database transaction, including by:

for a given probabilistic data structure in which at least one database key is inserted for the database transaction, registering the database transaction with the given probabilistic data structure by modifying an active transaction count value that is included in the given probabilistic data structure, wherein the registering is performed to prevent the given probabilistic data structure from being deleted while the database transaction is registered;

classifying the database transaction as a long-running transaction in response to making a first insertion cutoff determination that completing performance of the database transaction exceeds a specified amount of time; and based on the database transaction being classified as a long-running transaction, unregistering the database transaction from the given probabilistic data structure for which the database transaction was previously registered, wherein unregistering the database transaction from the given probabilistic data structure includes modifying the active transaction count value; and after classifying the database transaction, committing the database transaction; and before the committing of the database transaction, deleting at least one probabilistic data structure with which the database transaction was previously registered.

9. The non-transitory computer-readable medium of claim 8, wherein the operations further comprise:

making a second insertion cutoff determination that a specified number of probabilistic data structures have been written to as a part of performing the database transaction; and in response to the second insertion cutoff determination, unregistering the database transaction from the given probabilistic data structure for which the database transaction was previously registered.

10. The non-transitory computer-readable medium of claim 8, delaying insertion of database keys for the database transaction into probabilistic data structures until a pre-commit phase for the database transaction has been initiated.

11. The non-transitory computer-readable medium of claim 10, wherein the operations further comprise:

after initiating the pre-commit phase for the database transaction in relation to in-memory cache, inserting the set of database keys of the database transaction into a second set of probabilistic data structures; and in response to a request for a database record, sending a response to the request that includes the second set of probabilistic data structures.

12. A method, comprising:

receiving, by a database node, a request to perform a database transaction that involves writing a set of database records to an in-memory cache of the database node and inserting a corresponding set of database keys into a set of probabilistic data structures; and performing, by the database node, the database transaction, including by:

for a given probabilistic data structure in which at least one database key is inserted for the database transaction, registering the database transaction with the given probabilistic data structure by modifying an active transaction count value that is included in the given probabilistic data structure, wherein the registering is performed to prevent the given probabilistic data structure from being deleted while the database transaction is registered;

classifying the database transaction as a long-running transaction in response to determining that a specified number of probabilistic data structures have been written to as a part of performing the database transaction; and based on the database transaction being classified as a long-running transaction, unregistering the database transaction from the given probabilistic data structure for which the database transaction was previously registered, wherein unregistering the database transaction from the given probabilistic data structure includes modifying the active transaction count value; and after classifying the database transaction, committing the database transaction; and before the committing of the database transaction, the database node deleting at least one probabilistic data structure with which the database transaction was previously registered.

13. The method of claim 12, further comprising:

halting, by the database node, database key insertions for the database transaction into the set of probabilistic data structures until a pre-commit phase for the database transaction has been initiated.

14. The method of claim 13, further comprising:

after initiating the pre-commit phase for the database transaction, the database node resuming insertion of the set of database keys into a second set of probabilistic data structures.

15. The method of claim 14, further comprising:

prior to flushing the set of database records from the in-memory cache to a persistent storage that is shared between the database node and another database node, the database node sending the second set of probabilistic data structures to the other database node; and after flushing the set of database records from the in-memory cache to the persistent storage, the database node deleting the second set of probabilistic data structures.

* * * * *